(12) United States Patent
Deland

(10) Patent No.: US 6,899,269 B1
(45) Date of Patent: May 31, 2005

(54) MAGNETIC STRIPE AUTHENTICATION AND VERIFICATION SYSTEM

(75) Inventor: Robert S. Deland, Torrance, CA (US)

(73) Assignee: Mag-Tek, Inc., Carson, CA (US)

( * ) Notice: Subject to any disclaimer, the term of this patent is extended or adjusted under 35 U.S.C. 154(b) by 0 days.

(21) Appl. No.: 09/324,741

(22) Filed: Jun. 3, 1999

Related U.S. Application Data

(63) Continuation-in-part of application No. 09/120,816, filed on Jul. 22, 1998.

(51) Int. Cl.[7] .............................................. G06K 7/08
(52) U.S. Cl. ........................................................ 235/449
(58) Field of Search ............................................ 235/449

(56) References Cited

U.S. PATENT DOCUMENTS

| | | |
|---|---|---|
| 4,423,415 A | 12/1983 | Goldman |
| 4,476,468 A | 10/1984 | Goldman |
| 4,489,318 A | 12/1984 | Goldman |
| 4,546,352 A | 10/1985 | Goldman |
| 4,568,936 A | 2/1986 | Goldman |
| 4,630,845 A | 12/1986 | Sanner |
| 4,635,054 A | 1/1987 | Goldman |
| 4,650,978 A | 3/1987 | Hudson et al. |
| 4,689,477 A | 8/1987 | Goldman |
| 4,748,679 A | 5/1988 | Gold et al. |
| 4,752,837 A | 6/1988 | DeLand, Jr. ................. 360/51 |
| 4,785,290 A | 11/1988 | Goldman |
| 4,806,740 A | 2/1989 | Gold et al. |
| 4,807,287 A * | 2/1989 | Tucker et al. ................. 380/23 |
| 4,837,426 A | 6/1989 | Pease et al. |
| 4,906,988 A | 3/1990 | Copella |
| 4,916,294 A | 4/1990 | Goldman |
| 4,985,614 A | 1/1991 | Pease et al. |
| 5,023,923 A | 6/1991 | Sanner et al. |
| 5,177,344 A | 1/1993 | Pease |
| 5,216,229 A | 6/1993 | Copella et al. |
| 5,235,166 A | 8/1993 | Fernadez |
| 5,254,843 A * | 10/1993 | Hynes et al. ................ 235/449 |
| 5,365,586 A | 11/1994 | Indeck et al. |
| 5,396,369 A | 3/1995 | Deland |
| 5,408,505 A | 4/1995 | Indeck et al. |
| 5,428,683 A | 6/1995 | Indeck et al. |
| 5,430,279 A | 7/1995 | Fernadez |
| 5,434,917 A | 7/1995 | Naccache et al. |
| 5,546,462 A | 8/1996 | Indeck et al. |
| 5,587,654 A | 12/1996 | Indeck et al. |
| 5,602,381 A * | 2/1997 | Hoshino et al. ............. 235/493 |
| 5,612,528 A * | 3/1997 | Green et al. ................. 235/449 |
| 5,616,904 A | 4/1997 | Fernadez |
| 5,625,689 A | 4/1997 | Indeck et al. |
| 5,627,357 A | 5/1997 | Cheng et al. |

(Continued)

Primary Examiner—Mark Tremblay
(74) Attorney, Agent, or Firm—Christie, Parker & Hale, LLP

(57) ABSTRACT

Magnetic stripe documents are identified and authenticated on the basis of repeatable magnetic characteristics of a stripe recorded with digital data and waveform characteristics of the sensed digital data. Stripes are sensed to provide an analog signal, only the portion storing leading zeros being used. Cyclically, the leading-zero portion is sampled and digitized to provide a target number of samples using a frequency locked loop. The target number of samples is then reduced by a selection process that attains a predetermined number of digital samples from central locations in magnetized portions of the record specifically, spaces between data transitions. Selected groups, each of a predetermined number of digital samples, are then combined to provide magnetic characteristic data. Such data is then combined with waveform data (range) to provide an identification word. Documents are verified by correlating reference and sensed identification words. One or several reference identification words also may be tested for excessive similarity suggesting a fraudulent copy.

23 Claims, 8 Drawing Sheets

U.S. PATENT DOCUMENTS

| | | |
|---|---|---|
| 5,647,003 A | 7/1997 | Pease |
| RE35,599 E | 9/1997 | Pease |
| 5,739,517 A | 4/1998 | Hoshino et al. |
| 5,740,244 A | 4/1998 | Indeck et al. |
| 5,767,495 A | 6/1998 | DeLand, Jr. ................ 235/449 |
| 5,829,743 A | 11/1998 | DeLand, Jr. et al. ......... 271/273 |
| 5,920,628 A * | 7/1999 | Indeck et al. .................. 360/25 |
| 5,988,500 A * | 11/1999 | Litman ....................... 235/450 |
| 6,053,406 A * | 4/2000 | Litman ....................... 235/449 |

\* cited by examiner

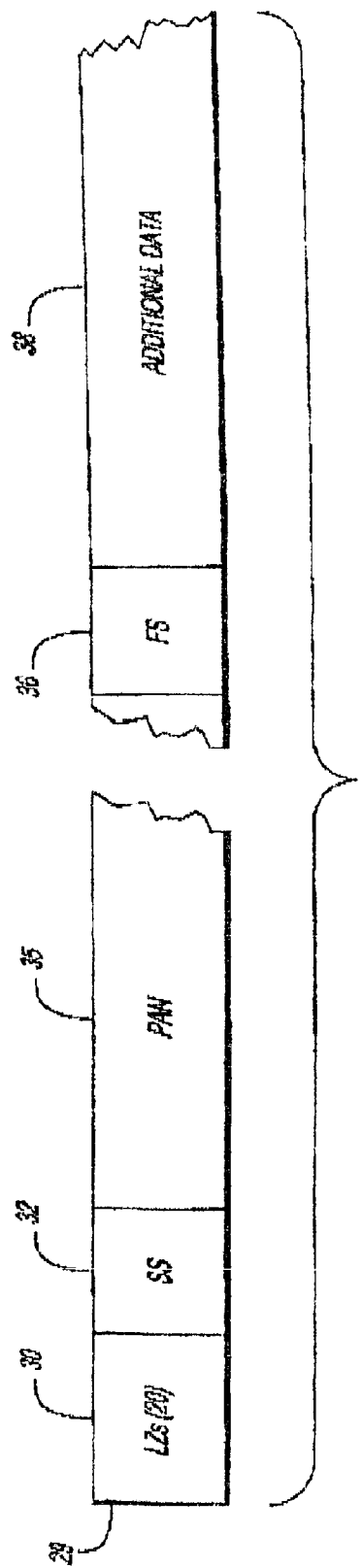
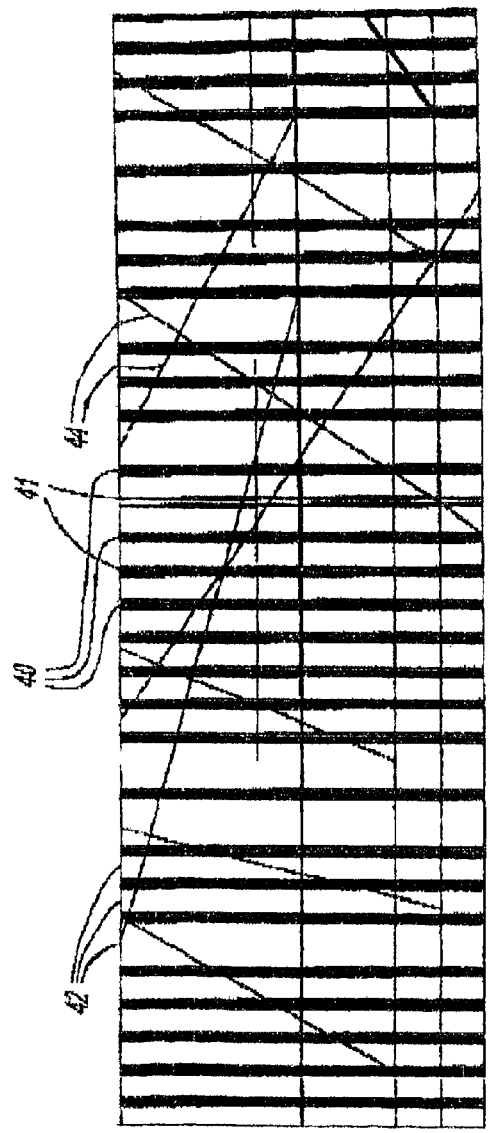
FIG. 2
FIG. 3

MAGNETIC STRIPE AUTHENTICATION AND VERIFICATION SYSTEM

This is a continuation-in-part of application Ser. No. 09/120,816 entitled MAGNETIC STRIPE CARD VERIFICATION SYSTEM filed Jul. 22, 1998.

BACKGROUND AND SUMMARY OF THE INVENTION

Generally, the present development relates to systems and processes utilizing the repeatable characteristics of a magnetic stripe for authenticating stripe bearing objects, e.g., documents as credit cards.

Various forms of cards and other documents bearing a magnetic stripe have long been used for a variety of different purposes. Such magstripe cards are currently used in large numbers, for example in the forms of credit cards, debit cards, tickets, passes, I.D. cards and so on. Typically the magnetic stripes of such cards carry digitally recorded data, for example relating to the use of the card, the assigned user, and so on.

Although magnetic stripe documents are widely and successfully used in commerce and industry, various forms of copying have become common place. The aggregate losses from fraudulently copied magstripe cards are very large. Consequently, a continuing need exists for a practical and economical system and method to reliably identify, and thus verify or authenticate magstripe documents.

Over the years, there have been numerous proposals for verifying documents, including techniques for authenticating magnetic stripes. A substantial number of prior proposals have been based on a concept of using certain magnetic characteristics of the magnetic stripe to verify documents, as cards. In that regard, it has been determined that magnetic stripes possess inherent, substantially unique, magnetic characteristics that can be repeatedly sensed. Over the years, these characteristics have been recognized as contributing a signal component sometimes considered to be noise in the sensed analog signal. Thus, along with the sensed data, a repeatable signal component (noise) also is present. Essentially, just as the magnetic characteristics of individual stripes are distinct, the resulting "noise" signals are somewhat unique and can characterize or identify magnetic stripes. Thus, it has been proposed to employ such magnetic characteristics and the resulting "noise" signals as a basis for identifying and verifying individual magnetic stripe documents. In some instances, the general technique has been compared to the science of human fingerprinting, that is, involving the use of a somewhat unique physical characteristic for purposes of identification. However, although various verification techniques and structures, based on the noise or characteristic magnetic component of a sensed magstripe signal have been proposed, they have not been widely accepted.

One prior proposal involved using a separate non-data magnetic stripe placed on a document specifically for purposes of identifying the document. Other proposals have involved various treatments of the magnetic stripe, usually involving the signals that are recorded and sensed from magnetic stripes.

Typically, the magstripes on conventional magstripe cards are divided into parallel tracks that are digitally recorded and sensed. Many of the prior proposals for magstripe document verification have involved the record of one track of the magnetic stripe in the form of digital data represented by magnetic transitions along the length of the magnetic stripe. Portions of analog signals sensed from the magnetic track transitions, or other portions of the signal have been proposed for use in characterizing the card or document. For example, on a time base, peaks in the sensed analog signal (representing magnetic transitions) have been proposed for use in verifying the magnetic stripe. Other proposals have suggested using other portions of the sensed analog signal from one of the magnetic tracks. For example, the relatively flat signal portions representative of magnetized regions of the stripe (located between magnetic transitions) have been proposed for use.

Various techniques also have been proposed for attaining more consistent results in sensing the magnetic characteristic signals. For example, techniques have included: averaging the results of multiple sensings, oversampling (increased sampling as by a factor of one hundred) and using a phase locked loop to control sampling. It also has been opined that for identification and verification purposes, sizable variations are quite acceptable between individual sensings of magstripe characteristics.

In the final analysis, as indicated above, in spite of the numerous structures and techniques proposed for magstripe fingerprinting, the concept has not gained widespread acceptance. That is, using the so called "remanent noise" in a signal sensed from magstripes to verify individual documents has not come into widespread use. Rather, although numerous proposals have been suggested for such operation, the technique simply has not gained significant commercial or industrial acceptance.

Typically, magnetic stripe fraud involves variously copying the recorded data (including verification data) in either a digital or analog form and using it to verify a transaction. Thus, a considerable need exists for a reliable system of combating fraud related to magstripe documents, which fraud may involve various forms of copying, duplicating or misdirecting data.

In general, the system of the present invention is based on recognizing the various problems of using the repeatable characteristics of a magstripe for purposes of verification, for example, in broad commercial and industrial applications. In that regard, it has been determined that many problems arise in the arenas of broad industrial and commercial use which are not apparent in the laboratory.

One major consideration relating to the extensive use of magnetic characteristics for card verification involves the number of cards used in a system. For example, a commercial credit-card system may be required to accommodate many thousands of individual cards operating randomly in combination with hundreds, if not thousands, of individual processing units. Furthermore, in an extensive system, reliability becomes exceedingly important, particularly in the realms of financial and security transactions, as are involved with financial cards.

In general, the system of the present invention involves improvements that enable magnetic characteristic verification techniques to operate successfully and reliably in the realms of widespread commercial and industrial applications. Specifically, the processes and systems of the present invention are directed to developing reliable magnetic stripe verification in a large scale system.

As disclosed herein, repeatable magnetic characteristic signals (resulting from specific characteristic features of the magstripe) may be selected from defined areas of a digitally-recorded magnetic stripe. The defined areas may be located between magnetic data transitions. Such defined areas of the stripe may be magnetized to a level of saturation and accordingly produce relatively flat (stable) sections in the sensed analog signal. Although these signal sections are relatively flat, they manifest a low level signal (noise) representative of the repeatable magnetic characteristics or features of the stripe. Thus, such signal sections may be used to reliably characterize each magnetic stripe in a manner somewhat analogous to a fingerprint. As disclosed herein, further reliability is attained by testing signal amplitude and symmetry characteristics as well as challenging digital copies by excessive similarity tests involving recently sensed characteristics.

Regarding the basic characteristic determination, as disclosed herein, after sensing a magstripe to produce a magnetic analog signal (typically containing digital data) a target number of samples are taken from several relatively flat sections of the analog signal using a frequency lock loop. Individual samples in each group are converted to a digital form, then selectively processed to obtain a predetermined subset of samples. The predetermined subset of digitized samples is then further processed by offset selection to accomplish a sub-subset of digitized samples that become a component of a characteristic designation used for identification. That is, several sub-subsets of digitized samples are collected to form part of an identifier for the magstripe-bearing card.

With the magnetic characteristic resolved to a digital representation, dynamic range information is extracted from the digitized samples to supplement the magnetic characteristic in the representative identifier. In the disclosed embodiment, the dynamic range information is based on amplitude symmetry or waveform characteristics as disclosed in detail below. Generally, by including dynamic range information in the identifier for a magnetic stripe, certain forms of the copied identifier can be distinguished as disclosed in detail below.

Other methods of copying may present the identifier in a digital form, for example, in the ultimate form for the test comparison. As disclosed herein, such copying is challenged by comparing the presented identifier with recently sensed identifiers which are the likely source of copies. If the degree of similarity is excessive, copying is suggested. Otherwise, the freshly sensed identifier is tested by correlation with reference identifiers to verify the card or other document.

BRIEF DESCRIPTION OF THE DRAWINGS

In the drawings, which constitute a part of this specification, exemplary embodiments exhibiting various objectives and features hereof are set forth, specifically:

FIG. 2 is a graphic representation of a portion of a data record on a magnetic stripe track as shown in FIG. 1 and used in accordance herewith;

FIG. 3 is a grossly-enlarged pictorial view of a magnetic data pattern showing a small portion of a stripe track as graphically illustrated in FIG. 2;

DESCRIPTION OF THE ILLUSTRATIVE EMBODIMENTS

As is required, detailed illustrative embodiments of the present invention are disclosed herein. However, documents, physical magnetic systems, data recording formats, and operating structures in accordance with the present invention may take a wide variety of different forms, some of which may be quite distinct from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
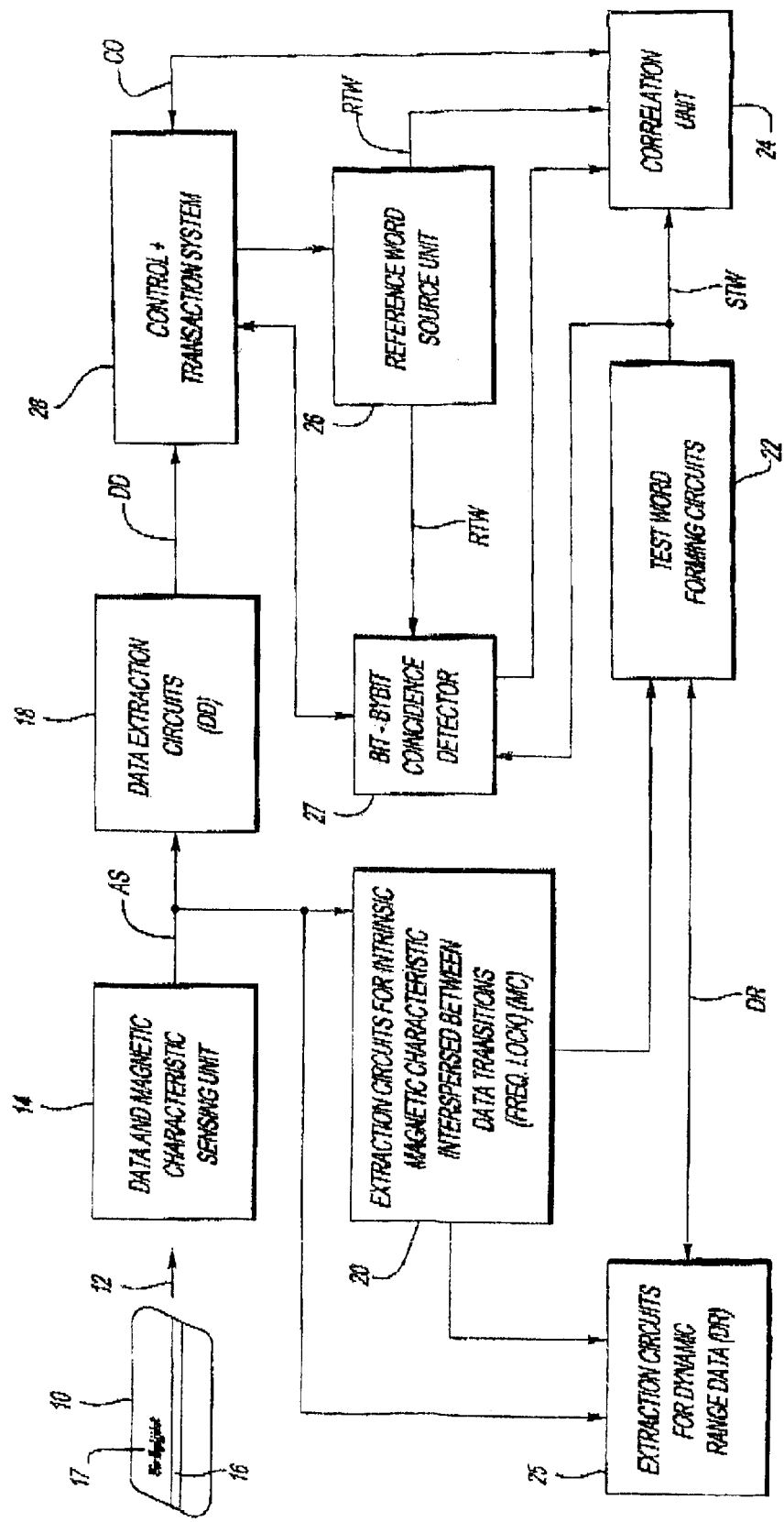
FIG. 1 is a block diagram of a system constructed in accordance with the present invention.

In FIG. 1, a magnetic stripe card 10 (left) is shown exemplifying a document, entering (arrow 12) a sensing unit 14. The magnetic stripe card 10 may take the form of a conventional bank card comprising a wallet-sized sheet of plastic material bearing the magnetic stripe 16. In the exemplary form, the card 10 is embossed and printed with indicia 17 to indicate the issuing entity, the holder's name, the account number and so on. The magnetic stripe 16 on the card 10 has at least one track recorded with digital data and possesses a repeatable magnetic characteristic as discussed above.

Functionally, the sensing unit 14 produces at least one analog signal AS from a recorded track that carries both the recorded digital data DD of the stripe 16 and representations of the repeatable magnetic characteristic MC. In accordance herewith, the analog signal AS is processed to provide three digital representations, i.e. digital card data (e.g. account number, etc.) magnetic characteristic data and waveform or range characteristic data. The card data is used to process the card, and possibly to enable or reflect a transaction. The characteristic data (magnetic and waveform) serves to verify the card, as against, direct and indirect copies, as well as misdirected data. Furthermore, in accordance herewith, representations of the characteristic data are compared with prior presentations for excessively high degrees of similarity or exactness, which may suggest copying. Note that herein, similar designations are used for data and representative signals.

Returning to the structure of FIG. 1, as indicated, the sensing unit 14 comprises a magnetic stripe read unit for sensing the magnetic stripe 16 on the card 10 to produce the analog signal AS. Note that with repeated sensings, even though the digital data DD recorded by the stripe 16 may be changed with time, the magnetic characteristic MC can be extracted as a repeatable component of the sensed analog signal AS. As indicated above, sometimes the magnetic characteristic signal MC (representing the characteristic MC) has been considered noise. However, the signal MC manifests a characteristic feature of the magnetic stripe 16 and in accordance herewith serves as one basis to verify the card 10. As disclosed in detail below, from the analog signal, the signal components DD and MC are separately extracted by a pair of extraction circuits 18 and 20 respectively. The dynamic range data DR characterizing the analog signal AS (as by waveform amplitudes) is extracted by extraction circuits 25.

From the circuit 18, the digital data signal DD is provided to a control and transaction system 28 for further processing as described below. In various applications, the data signal DD may be variously employed, as for example, to support a credit transaction or drive an automatic teller machine.

As described in greater detail below, in the extraction circuit 20, the characteristic analog signal AS is sampled during defined sampling intervals SI, the samples being digitized to accomplish groups or sets of digitized samples DS. Selected samples from the sets representing the magnetic characteristic, are developed by forming circuits 22 and combined with range data signals (circuits 25) in the circuits 22 to provide a sensed test word STW.

Representative signals for the "sensed" test word, termed STW, are applied to a correlation circuit 24. To function, the correlation circuit 24 also receives at least one "reference" test word RTW from a source unit 26. The reference source unit 26 may take a variety of different forms. For example, a sensed test word STW could be formed as described herein then recorded digitally on the card 10 for direct provision by the unit 26 as a reference test word STW. However, in the currently preferred embodiment, the reference unit 26 accesses a data bank (not shown) to provide several reference test words RTW for correlation with a freshly sensed test word STW as described below.

In addition to the correlation of reference and sensed test words by the correlation unit 24, a preliminary test of the words is performed by a bit-by-bit coincidence detector 27. Basically, the detector 27 tests the sensed test word STW against the reference test words RTD for degrees of exact similarity which may suggest fraud. If the test is successful (no excessive similarity), then independently, the correlation unit 24 correlates the test words. If that test is successful, the central and transaction system 28 is signaled.

Note that the control and transaction system 28 may incorporate offsite components and furthermore, may incorporate or overlap apparatus involving the source unit 26. For example, the transaction system 28 may be integral with the reference unit 26 comprising a structure for addressing a data bank containing data on a card user's account number. As a consequence, the data bank provides at least one reference test word for comparison tests. Also note that such data can be combined with other identifiers, e.g. PIN, PAN, etc. to combat fraud otherwise by various comparisons.

The control and transaction system 28 also may embody various other operating equipments or systems, e.g. automatic teller machines, entry or access controls, card verification units, and so on. Thus, the digital data signal DD is processed and variously utilized by the control and transaction system 28.

As suggested, the stripe 16 (FIG. 1) includes a plurality of individual record tracks. A single track is treated herein. Specifically, a typical format for a track 29 (FIG. 2) of the magnetic stripe 16 is fragmentarily illustrated (not to scale). Initially, a section 30 stores a series (e.g. approximately twenty) of leading zeros designated LZs. Analog signal AS from the leading zero section 30 conventionally synchronizes the timing for subsequent operations. However, in accordance herewith, the uniform digital recording of the leading zeros section 30 also is used to provide the magnetic characteristic data MC.

Next in the track 29 format of FIG. 2, a section 32 carries a start sentinel SS. Thereafter, a section 35 stores a primary account number PAN for the assigned card user. The next section 36 stores a field separator FS which is followed by a section 38 for storing various additional data AD. The sections are well-known and are defined by the International Standards Organization. However, as shown, they are merely illustrative and any of wide variety of formats may be employed in systems of the present development.

In relation to the digital data recorded on the stripe 16, for example, in the track 29 (FIG. 2), devices are well-known for actually viewing the magnetic configuration including the digital recording pattern. Magnetized regions are clearly visible separated by magnetic transitions. Such a view is represented in FIG. 3 with individual magnetic transitions 40 and 41 appearing between magnetized regions 42. Note that scratches 44 also appear in the figure.

In accordance herewith, it is important to understand that magnetic characteristic data MC is sensed from the magnetized regions 42 (FIG. 3) in the leading zero section 30 (FIG. 2) of the track 29. The regions 42 translate to relatively flat, or stable sections, of the signal AS.

Figure 4A:
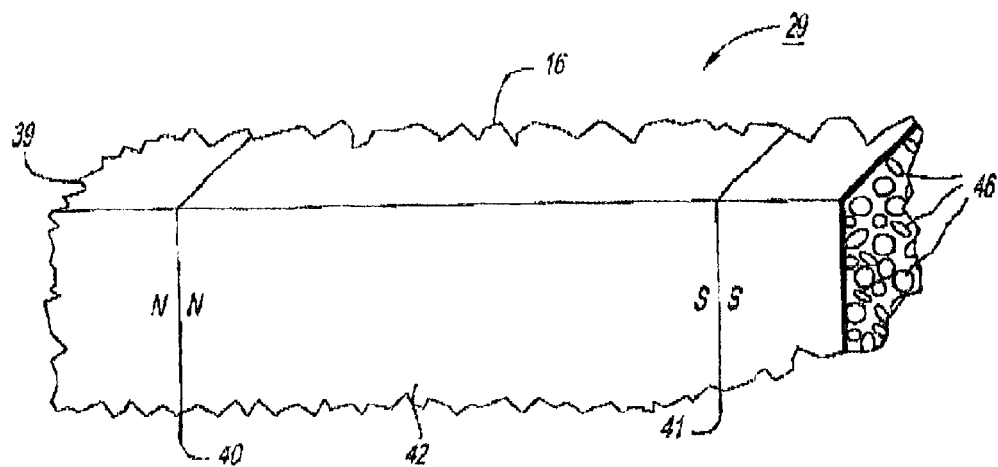
FIGS. 4A and 4B show a related pair of graphic representations relating to a small portion of a track as illustrated in FIG. 2.

FIG. 4A shows a grossly enlarged fragment 39 of the magnetic stripe track 29. A pair of magnetic transitions 40 and 41 (representing digital data) are indicated, defining a magnetized region 42 between them. Incidentally, individual magnetic particles 46 (right) also are indicated in the cross section. Generally, it has been understood that the inherent variations of these particles 46 at specific locations account for the magnetic characteristic MC (fingerprint) of the stripe 16.

Below the track fragment 39 (FIG. 4A), an aligned waveform 50 (FIG. 4B) illustrates the representative analog signal AS selectively showing signal amplitude variations 48 from a region 42 (FIG. 4A). Of course, other portions of the analog signal AS also contain such variations in relation to the pulses 52 and 54, however, the variations 48 are of primary interest and therefore are shown isolated in the idealized waveform 50. Thus, the pulses 52 and 54 represent the transitions 40 and 41 as digital data DD and the variations 48 indicate the magnetic characteristic (noise) of interest. Recapitulating, in the present embodiment, the magnetic characteristic MC (FIG. 4B) is taken from the variations 48 in the relatively flat portions 56, (termed interspersed portions IP) of the analog signal AS representing the leading zeros section 30 (FIG. 2) of the track 29.

For the magnetic characteristic MC, as mentioned above, digital samples of the variations 48 are formed into digital representations. For the dynamic range information DR, waveform characteristics of the analog signal AS are reduced to digital representations. For example, as disclosed below, the dynamic range information might for example take the form of relative peak amplitudes or line offset ratios in the analog signal AS. Specifically, referring to FIG. 4B, the range information might constitute a ratio of the peak amplitudes of pulses 52 and 54 as well as ratios of pulse amplitude to center line offset at the section 56. Such information may be represented as a few binary bits while, the magnetic characteristic MC might be represented by several bits, e.g. twenty. Accordingly, an exemplary test word STW of 24 bits may be formulated as follows:

TEST WORD

100110101100010110110100

**MC***********-DRspecific test word TW thus characterizes each magnetic stripe card and is stored for reference comparisons as indicated above. However, in accordance herewith, it has been recognized that a prior test word STW might be copied in an effort to support a fraudulent transaction. Generally, such a copied word will result in a closer correlation than if the test word STW were freshly generated. That is, by digitally copying a test word, an exact coincidence may occur, which event would be very unlikely in sensing and developing a fresh test STW. Consequently, in accordance herewith, a record of reference test words RTW (e.g. original and recently used words) is stored for bit-by-bit correlation with words asserted as proper sensed test words to support transactions. The occurrence of a very close bit-by-bit comparison suggests fraudulent digital copying of a test word. For example, a dissimilarity of only four or less bits between a sensed test word STW and an asserted reference test word RTW may suggest fraud.

In accordance herewith, asserted test words STW first are compared with reference test words RTW seeking excessive similarities. In the event of a near identity, the transaction is denied based on the suggestion of digital copying. Essentially, a drop off list of the last several sensed test words STW may be stored as reference test words RTW for comparison. If the bit-by-bit comparison indicates sufficient dissimilarity, the system then proceeds with a correlation of a reference test word RTW with the sensed test word STW, asserted as being freshly sensed.

Figure 4B:
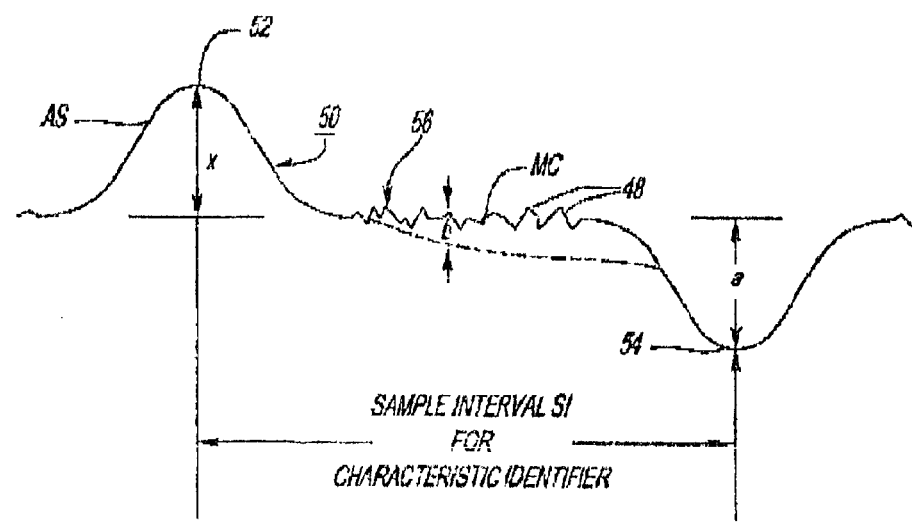
Figure 5:
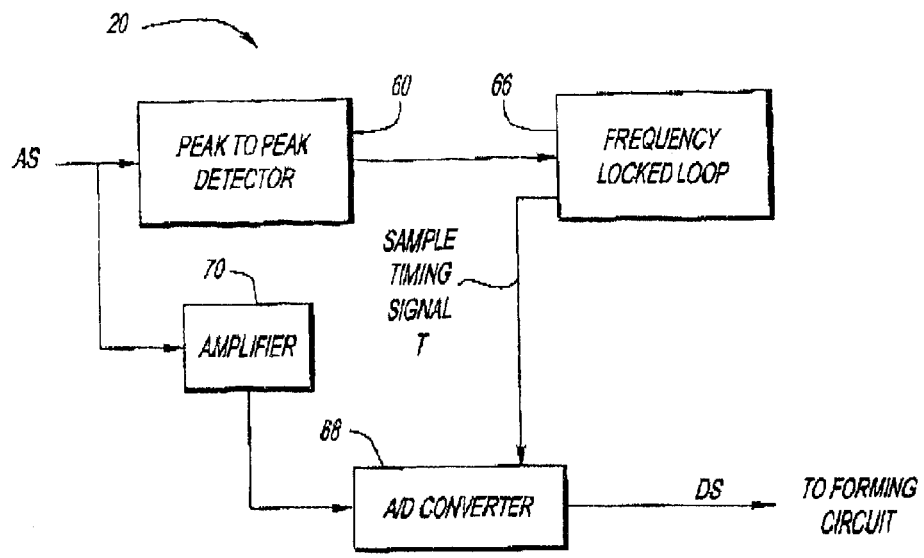
FIG. 5 is a block diagram indicating one form of characteristic extraction circuit as may be utilized in the system of FIG. 1.

Recognizing that a variety of structures and processes may be employed to develop test words with magnetic characteristic data MC and dynamic range data DR, techniques of the disclosed system will now be considered. Referring to FIG. 4B, the peaks of the pulses 52 and 54 are detected in the extraction circuits 20 (FIG. 1) to define a sampling interval SI. The actual sampling operation is performed during each sampling interval SI, also by the extraction circuits 20 (FIG. 1) an illustrative form of which is shown in FIG. 5. Consider the operation with concurrent reference to FIG. 6 illustrating the various signals in an idealized. form, and not to scale. Also, note that the scale of FIG. 6 is grossly enlarged with respect to the curves of FIG. 4, and the curves of FIG. 6 are broken to simplify the representations.

During the sampling interval SI (FIG. 6A, time 62) the analog signal AS is applied to a peak-to-peak detector 60 (FIG. 5). Such circuits are well-known and can function in accordance herewith to define intervals between recurring peaks in the analog signal AS (FIGS. 4B and 6B). Accordingly, the peak detector 60 provides binary time signals 62 (FIG. 6A) defining each sampling interval SI.

Figure 6A:
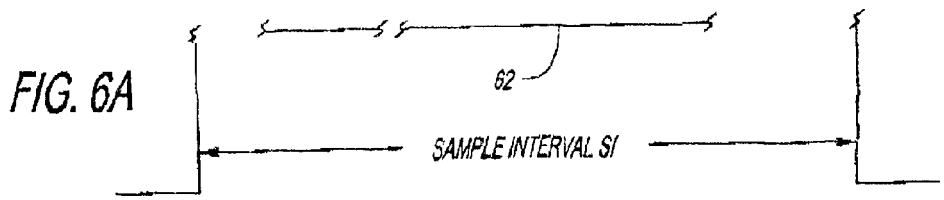
FIGS. 6A, 6B, 6C, 6D and 6E are a series of graphic representations relating to a small fragment of a representative analog signal from a magnetic stripe track as illustrated by FIG. 4.
Figure 6B:
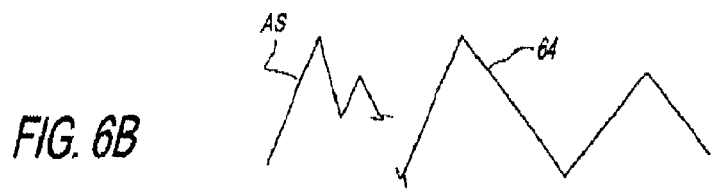
Figure 6C:
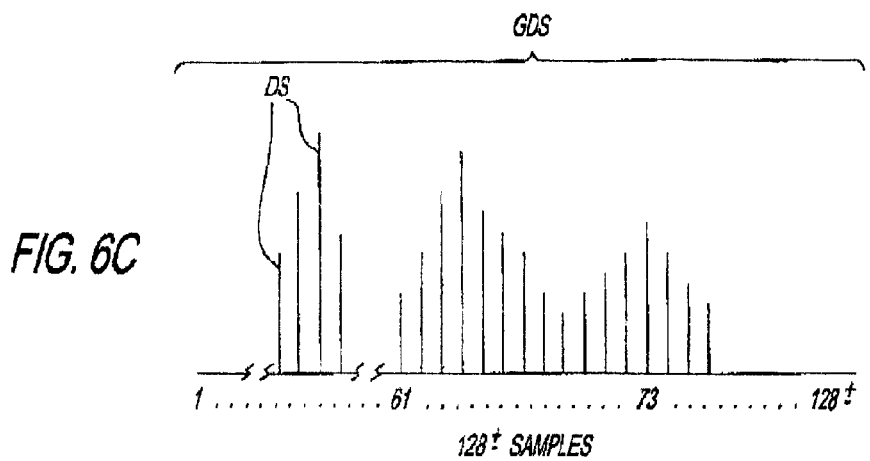
Figure 6D:
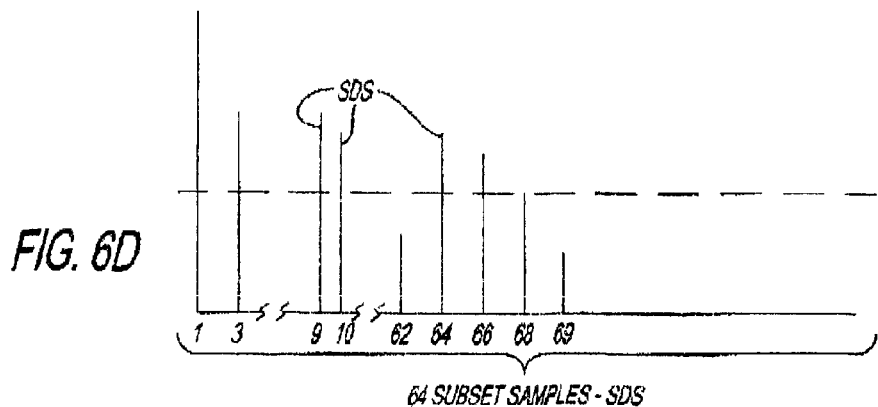

During a defined sample interval SI (peak-to-peak FIG. 6A), the analog signal AS (FIG. 6B, curve 64) is sampled to provide approximately one hundred twenty-eight digital samples DS (FIG. 6C not to scale). The individual samples are defined by a frequency locked loop 66 (FIG. 5) incorporating an oscillator (not shown). Forms of such circuits are well-known for defining a target number of cycles during each interval.

In the illustrative system, the frequency lock loop 66 has a target of defining one hundred twenty-eight samples during each sample interval SI (FIG. 6A). Thus, approximately one hundred twenty-eight samples are supplied from the loop 66 (FIG. 5) to an analog-to-digital converter 68 during each sampling interval. However, variations in the system, medium and so on normally account for more or less than one hundred twenty eight samples actually being accomplished.

The A/D converter 68 (FIG. 5) converts each sample (analog) to a digital form, for example, defined by a number of binary bits. Note that although converted to a digital form, the samples DS are illustrated as vertical bars in FIG. 6C. Signals representative of the digitized samples DS are supplied from the extraction circuit 20 (FIG. 1) to the extraction circuit 25 and the test word forming circuit 22.

In accordance herewith, a predetermined number of digitized samples DS (subset) is to be consistently used for each sampling interval SI. To accomplish the predetermined number of samples DS for each sampling interval SI, a re-sizing operation is performed to produce a subset (e.g. "64") from the varying total number of samples (e.g. "128±"). The re-sizing operation is performed in the characteristic forming circuit 22 (FIG. 1) as will be considered below. However, preliminarily, some further graphic considerations are provided.

In the disclosed embodiment, the samples for representing the magnetic characteristic MC are taken from the last eight interspersed portions 56 (FIG. 4B) of the leading-zeros section 30 (FIG. 2) of the track 29. These signal portions 56 represent the magnetized regions 42 (FIG. 4A) in the leading zeros section 30 of the track 29 located between data transitions 40 and 41.

Note that FIGS. 4 and 6 represent a single sampling interval SI. Accordingly, as explained in detail below, the last eight intervals in the leading zeros section 30 are stored in the forming circuit 22 (FIG. 1) and processed to accomplish a series of binary words that are then combined with the dynamic range data to form the test word STW.

The forming circuit 22 (FIG. 7), includes a control unit 80 (lower left) coupled to receive sample interval signals SI along with a signal from a sentinel detector 82 which in turn receives the analog signal AS. In operation, the detector 82 senses a signal representative of the sentinel SS (FIG. 2) indicating the end of the leading zeros. The end of the leading zero, portion 30 (FIG. 2) is thus indicated to the control unit 20.

The control unit 80 (FIG. 7) also is connected to a register 86 which receives sets of digitized samples DS from the analog-digital converter 68 (FIG. 5). The register 86 (FIG. 7) is basically an overflow register, which retains only the last eight sets of received digitized samples DS for processing. The stored eight sets of digitized samples DS are then bulk transferred from the register 86 (FIG. 7) to a working storage 88 for processing. The working storage 88 is connected to interface an Nth sample processor 90 and an offset processor 92. The processors 90 and 92 are also connected to the control unit 80.

Essentially, sets (e.g. "8") of the digitized samples DS (FIG. 6C) are first processed by the processor 90 (FIG. 7) to provide subsets consistently including a predetermined number of digitized samples, e.g. "64" samples. The resulting subsets of digitized samples DS are further reduced to sub-subsets by the processor 92 e.g. "24" samples. The second reduction limits samples to central samples, those well within the "flat" portions of the analog signal AS. Essentially, each set of digitized samples DS is reduced first to a specific-number sub-subset of samples then to provide a central sub-subset as the ultimate magnetic characteristic MC. The sub-subsets of digitized samples DS are accumulated in the storage 94 which also receives the digitized dynamic range data DR to form the test word STW.

Figure 7:
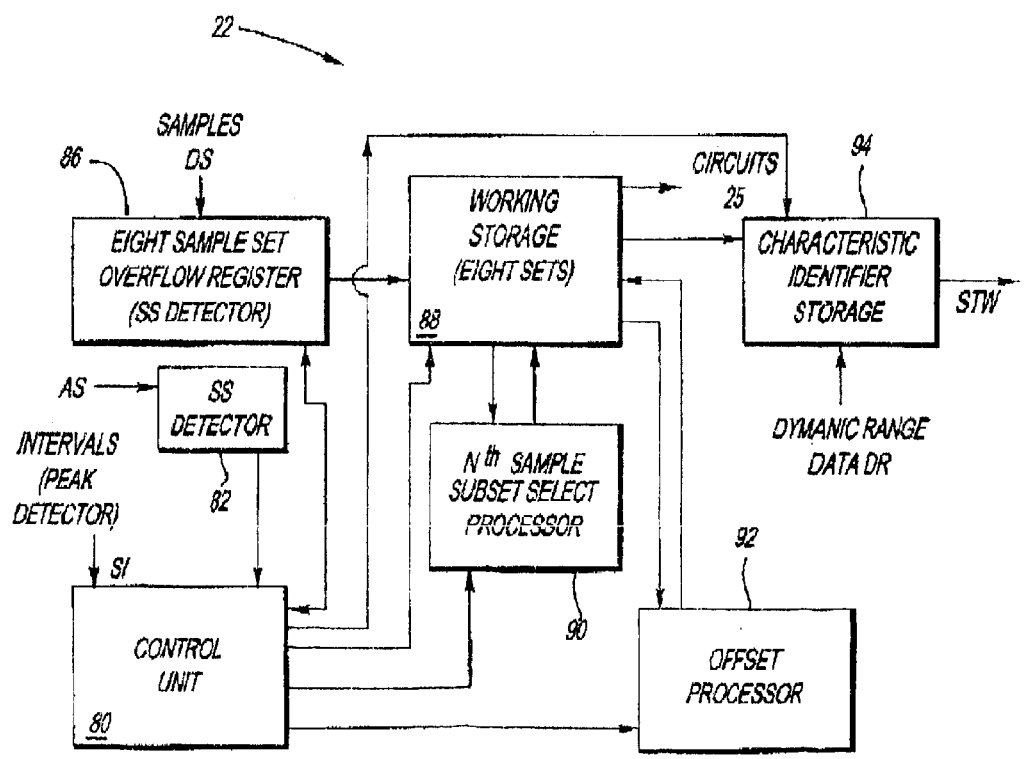
FIG. 7 is a block diagram indicating one form of identifier forming circuit as may be utilized in the system of FIG. 1.

It is to be noted that certain elements of the forming circuit as shown in FIG. 7 have been separately shown merely for purposes of convenient explanation. As throughout, in an operating system, various elements might be incorporated or combined. Of course, a wide variety of different processing techniques may be utilized in accordance herewith to accomplish the process as explained in greater detail below with reference to a logic flowchart.

In view of the above descriptions, a complete understanding of the disclosed system can now best be accomplished by pursuing an explanation of the process and providing further component descriptions where pertinent. Accordingly, assume the presence of a magnetic stripe card 10 (FIG. 1)

bearing a magnetic stripe 16 with a digitally recorded track 29 (FIG. 2). As represented by a block 100 (FIG. 8), the unit 14 (FIG. 1) senses the leading zeros section 30 as the portion of the analog signal AS (FIG. 4B) which is applied to: the data extraction circuits 18 (FIG. 1), the magnetic characteristic extraction circuits 20 and the range data extraction circuits 25. The data extraction circuits 18 extract the digital data DD which is supplied to the central and transaction system 28. Such data includes representations for accessing a data bank to provide reference test words RTW as explained above.

The extraction circuits 20 first digitize the analog signal AS (FIG. 8, block 102) storing the last eight sets ("128±") of samples (block 104). The sets of samples are then processed, set by set (block 106). Essentially, the sets are reduced to subsets of "64 ".

This operation is performed because even though the sampling intervals are controlled by a frequency lock loop, in an operating environment, the number of samples taken during a sample interval may vary, e.g. potentially including either a few additional samples or a few less samples. Re-sizing to obtain a specific number of samples (e.g. "64") has been determined to be somewhat critical in certain applications. The processor 90 (FIG. 7) accomplishes the subset selection and may simply be implemented to execute the logic of FIG. 8. An initial query, (block 108 FIG. 8) indicates three possibilities with respect to the set of digitized samples. The set might either: (1) be equal to the target number of one hundred twenty-eight, (2) be more than the target number or, (3) be less than the target number.

If the target number of one hundred twenty-eight was accomplished, the process simply proceeds to a junction 110 (FIG. 8, lower center) from which a subsequent reduction step occurs. However, if the number of actual digitized samples in the set is less than one hundred twenty-eight, the process proceeds to a step of a query block 112 allowing three different possibilities, i.e. the samples number either: one hundred twenty-five, one hundred twenty-six or one hundred twenty-seven. Of course, greater numbers of displacements from the target number can be accommodated; however, for purposes of illustration variations of up to "three" samples DS are treated as examples which could be expanded.

Assume the deviation from the target number is one hundred twenty-five samples. In that event, the process proceeds to a step as illustrated by a block 114 which is illustrated graphically in FIG. 6D. Basically, alternate samples are dropped (odd or even), with certain added exceptions to attain the predetermined number, e.g. sixty-four. However, in adding or deleting samples at spaced-apart locations, the odd-even sequence shifts with each deletion or addition. For simplification, assume a set of fourteen samples and a need for a subset of eight samples. If "odd" samples are initially selected, a switch to "even" samples is made with an addition. Specifically, the underscored samples are selected as eight:

To add samples, select the underlined:

1 2 3 4 5 6 7 8 9 10 11 12 13 14.

To remove samples a similar alternate selection is employed. For example, to obtain a subset of eight samples from a set of seventeen the pattern might be as follows:

To delete samples, select the underlined:

1 2 3 4 5 6 7 8 9 10 11 12 13 14 15 16 17.

Thus, according to the process, alternate samples are taken with additions to accomplish a subset of exactly sixty-four digitized samples DS. With such a predetermined subset, the operation proceeds to the junction 110, again, treated subsequently.

If the initial set of digitized samples DS constituted one hundred twenty-six samples, the process (FIG. 8) proceeds to a step represented by a block 116. Here, the process again involves selecting alternate samples DS along with additional samples to accomplish the desired subset, e.g. sixty-four.

Similarly, if one hundred twenty-seven samples were attained, the process proceeds to a step illustrated by a block 118 indicating an alternate selection, again adding to attain sixty-four. Thus, by using spaced-apart or distributed normally-rejected samples to supplement the selected samples, subsets SDS of a precise number are accomplished by the processor 90.

As indicated above, the actual number of samples in a set also may exceed the target number of samples. In that event, the process proceeds to a query block 120 (FIG. 8, upper right) indicating a step of identifying whether the excessive number of samples is "one," "two" or "three." If "one" excess sample exists, the operation proceeds to a step of block 122 which involves selecting alternate samples DS and deleting to attain the desired sixty-four. Thus, a precise subset of "64" samples DS is attained and the operation proceeds to SDS the junction 110.

Similar deletions occur in the event of two or three excess samples as represented by the blocks 124 and 126. In such events, samples are dropped in addition to the alternate selection. Thus, with a subset of precisely sixty-four samples DS, the process proceeds from the junction 110.

With each subset of precisely sixty four digitized samples, the next phase of the process is performed by the processor 92 (FIG. 7) to accomplish a sub-subset by offset selection. In that regard, several initial and final digitized samples DS are dropped, leaving a sub-subset of digitized samples DS taken from the relatively-stable (central) portion 56 (FIG. 4B) of the analog signal AS. Thus, the interspersed portion of the sample section is selected representing the central magnetized region 42 (FIG. 4A) as explained above.

Figure 6E:
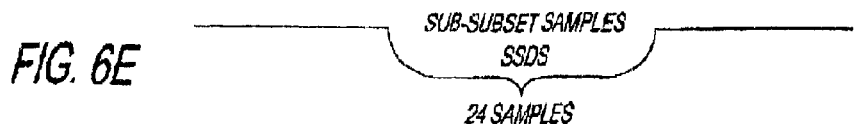
Figure 8:
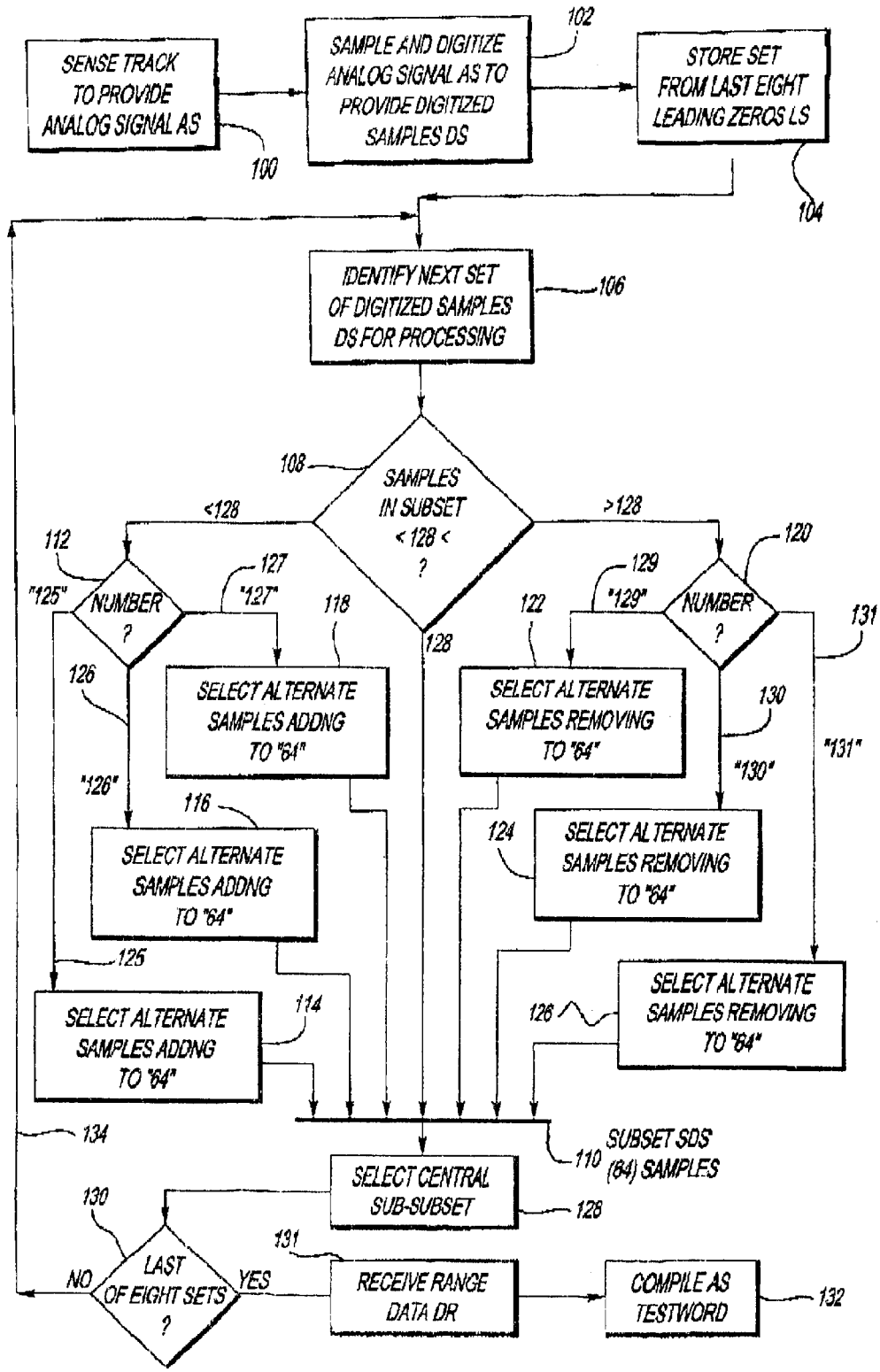
FIG. 8 is a flow diagram illustrating an exemplary process of the present invention as may be used in the system of FIG. 1.

The operation of the offset processor 92 may be relatively simple as represented by a block 128 in FIG. 8. Specifically, a central sub-subset of digitized samples DS, e.g. twenty-four is selected as indicated in FIG. 6E from each stored subset of sixty-four.

With the accomplishment of each sub-subset (twenty-four samples DS) the process proceeds to a query block 130 (FIG. 8, lower left) representing the step of determining whether all eight sub-subsets have been processed. When the last of the eight sets is complete, they represent the magnetic characteristic MC to be combined with the range data by the circuit 22 to provide the test word STW. The operation is represented in FIG. 8 by a block 132.

To form the digitized dynamic range data as a digital word, digitized samples DS stored in storage 88 (FIG. 7) are provided to the extraction circuit 25. The digitized samples define the analog signal AS and accordingly are processed to characterize the dynamic range (waveform features) of the analog signal. In the disclosed embodiment, two amplitude ratios are used as the range data. First, as illustrated in FIG. 4B, amplitude symmetry is taken as a ratio of the positive-going pulse 52(x) to an adjacent negative-going pulse 54(a). Thus, in the present embodiment, amplitude symmetry is determined by a ratio of x/a. As indicated, available digital representations of these values are held in the storage 88 (FIG. 7) and accordingly, the extractions circuits 25 (FIG. 1) simply receive such values to provide the ratio calculation after which the value is reduced to a few bits. The waveform component of the digitized dynamic range data DDR is formed somewhat similarly.

In the disclosed embodiment, the waveform characteristic actually is a standard parameter, specifically identified as "ISO/IEC Standard 7811-6, Table 1—parameter $U_{16}$". The indicated parameter has other uses in relation to magnetic tape; however, in the illustrative embodiment it serves as a specified waveform characteristic. Referring to FIG. 4B, the selected parameter is the ratio of a/b where b is a central derivation in the section 5 (FIG. 4B). With the range data characteristic so formed, it is merged with the magnetic characteristic data by the forming circuits 22. The merger may simply involve joining the representative data as the sensed test word STW.

Figure 9A:
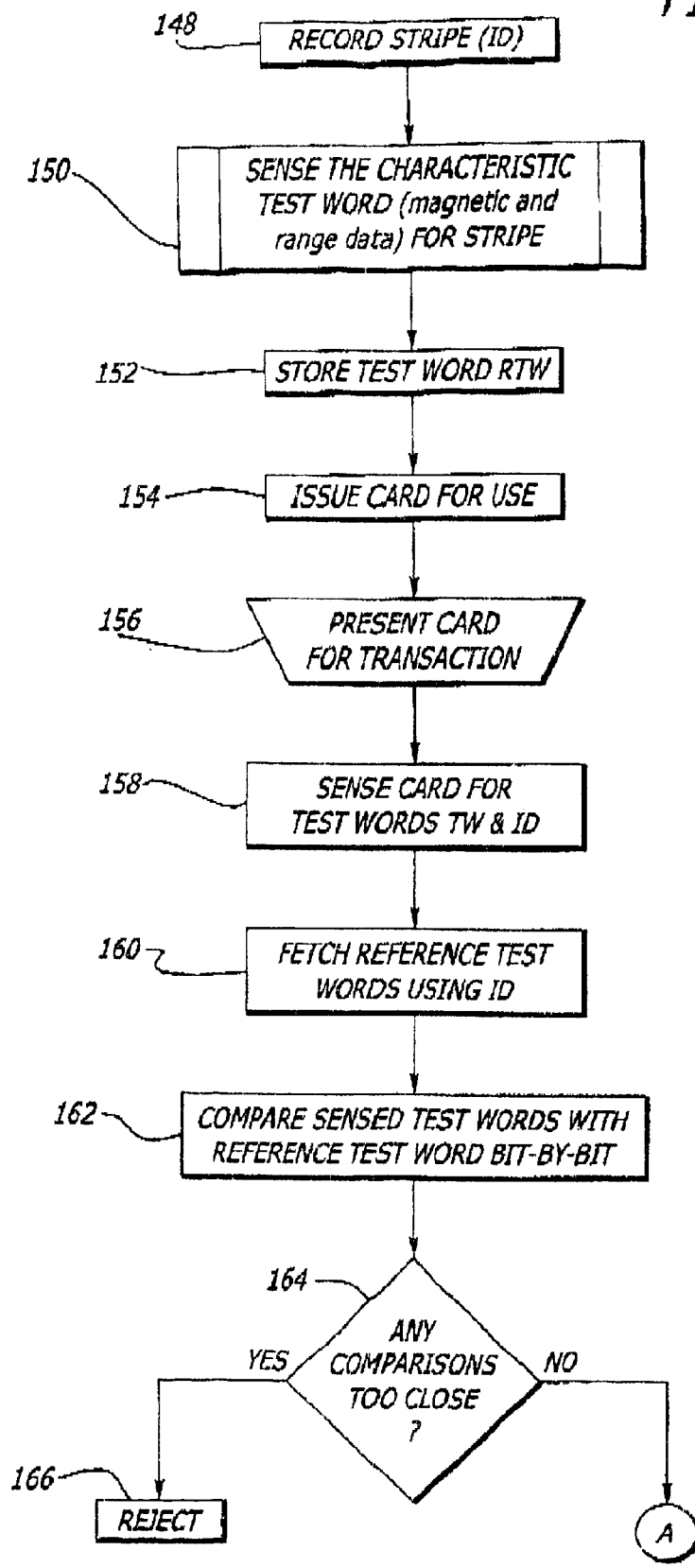
FIGS. 9A and 9B constitute a flow diagram of an exemplary process in accordance herewith.

To consider an overall operation, assume the card 10 (FIG. 1) is in a raw state and is to be processed for issuance. Initially, in accordance herewith, the stripe 16 is recorded with digital data DD (FIG. 9A, block 148). Next, the card is sensed and a test word STW is formulated, as described above, characterizing the stripe 16. The formation of the test word, represented as a process step by a block 150 in FIG. 9A is followed by storing the test word STW as a reference test word RTW (block 152) available in the future from the reference unit 26 (FIG. 1) addressed by the digital data DD.

With the card recorded and the reference test word RTW stored, the card is issued to a holder. In FIG. 9A, the issuing operation is represented by a block 154.

In due course, the card is presented, for example, to support a transaction as indicated by the block 156. Accordingly, the card is processed by structure in accordance with FIG. 1, for verification.

The card 10 is sensed for the analog signal AS which is to provide the digital data DD (identification) and the sensed test word (block 158).

Using the digital data DD, the control and transaction system 28 (FIG. 1) fetches at least one reference test word RTW (initially only one, however, later to include several recent test words) from the source unit 26 (including a central data bank), supplied to the coincidence detector 27. See the block 160.

The sensed test word STW and the reference test words are supplied to the detector 27 comparison. The detector 27 executes a bit-by-bit comparison between each referenced test word RTW and sensed test word STW seeking coincidence. Structurally, the detector 27 may simply involve a stepping register for moving the referenced test words RTW through stages for repeated comparison with the sensed test word STW to indicate coincidence between individual binary bits. Each lack of a bit coincidence is tallied. The processed step is illustrated by block 162 in FIG. 9A.

As explained above, total coincidence between one of the reference test words RTW and the sensed test word STW is a very strong indication of digital copying. Essentially, although the nature of the "fingerprint" system involves identification by a degree of coincidence, identity of coincidence is exceedingly unlikely. Accordingly, the detector 27 is set to count bit-by-bit deviations and provide a represented total to the correlation unit 24. Only in the event of less than substantial coincidence between the sensed test word STW and each of the referenced words RTD does the unit 24 proceed. Such deviation, indicates the lack of digital copying from a recently sensed test word. On the contrary, a coincidence or near coincidence (low number of deviations) prompts the detector 27 to signal the system 28 indicating a rejection of the transaction. These operations are represented in FIG. 9A by the query block 164 and the reject block 166. A proper comparison (with significant deviations) prompts the correlation unit 24 (FIG. 1) to proceed as indicated by the block 168 (note a transition from FIG. 9A to FIG. 9B).

Figure 9B:
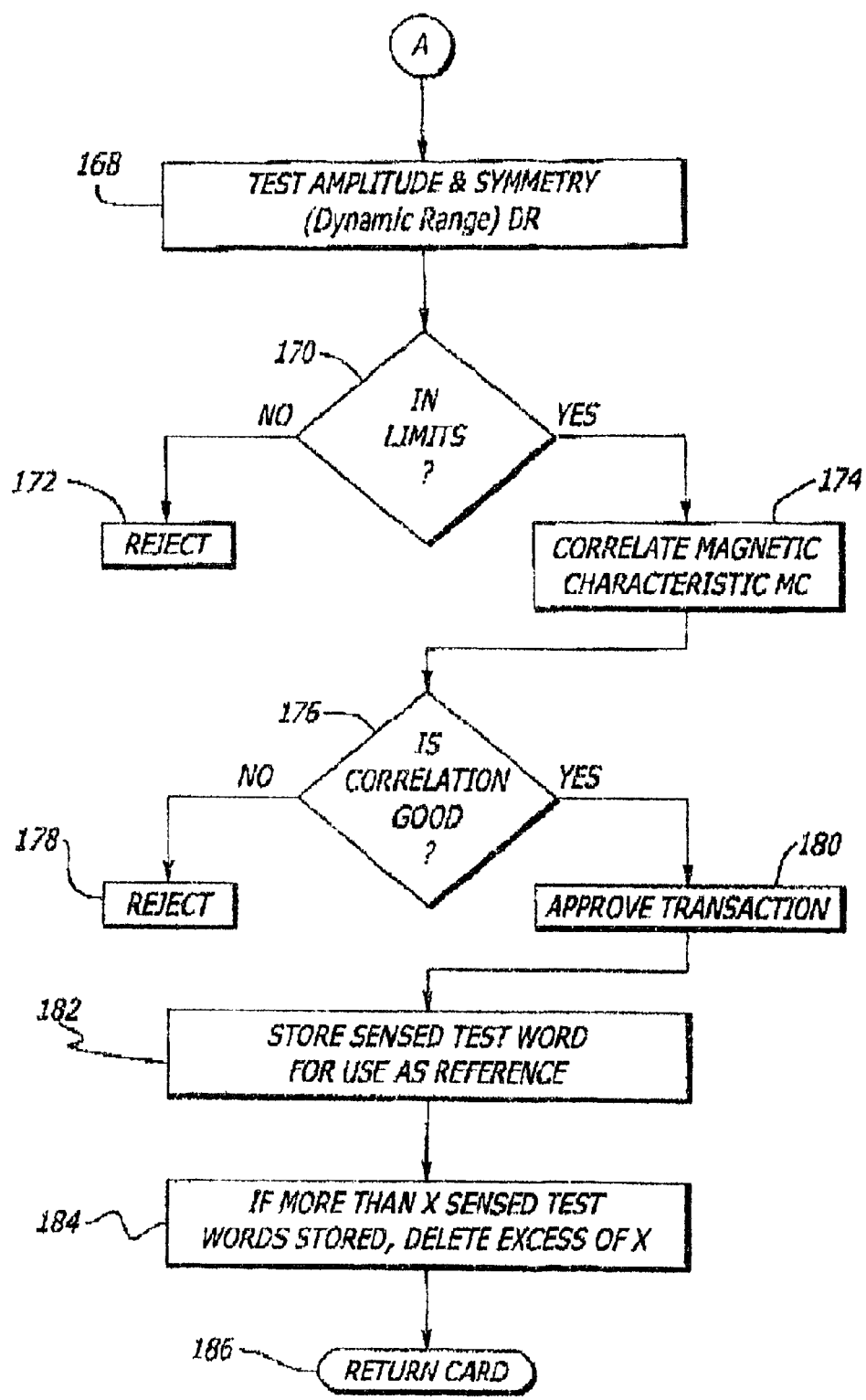

The continuing test is executed by the correlation unit 24 (FIG. 1) illustrated as two steps in FIG. 9B, i.e. correlation of the dynamic range information DR (blocks 170, 172 and 174) then correlation of the magnetic characteristic MC (blocks 176, 178 and 180). Of course, the nature and degree of an acceptable magnetic correlation will depend on design considerations for the specific system. However, generally, even a relatively loose degree of magnetic correlation indicates lack of copying.

With the occurrence of an approved transaction, the sensed test word STW, as provided, is stored (FIG. 9B, block 182) for subsequent use as a referenced test word RTW. In that regard, the sensed word is passed from the correlation unit 24 through the transaction system 28 to the source unit 28 for storage. Thus, a limited list or group of reference test words RTW are provided for subsequent comparison. In that regard, generally it has been determined expedient to limit the number of active reference test words to a predetermined number. Consequently, with the storage of a fresh test word, a test may be performed limiting the active group to the predetermined number (FIG. 9B, block 184). Note that the predetermined number, i.e. the number of active referenced test words utilized, involves various design criteria with considerations as to frequency of card use, values involved, and so on. As indicated, merely for example, six or eight words may be adequate.

As a final step in the process, a card 10 may be released as indicated by block 186 in FIG. 9B. Thus the process is complete.

In executing the process, it is noteworthy that the implementing components may be variously located. Typically, locations will involve a central station serving a multitude of remote terminal stations, e.g. merchant locations. In accordance with one embodiment, implementing circuits and so on to formulate the sensed test word STW and the digital data DD are located at card terminals, with the balance of the system located at a central terminal. However, several other variations may be practical for individual systems.

In view of the above explanation of an exemplary system, it will be appreciated that other embodiments of the present invention may be employed in different applications to verify, authenticate, identify or confirm documents, particularly magnetic stripe-bearing cards. While exemplary operations have been stated herein and certain detail structures have been disclosed, the appropriate scope hereof is deemed to be in accordance with the claims as set forth below.

What is claimed is:

1. An identification system for identifying authentic documents bearing a magnetic stripe recorded with digital data and having a repeatable magnetic characteristic, comprising:

a magnetic stripe sensor configured to sense the magnetic stripe to provide an analog signal representative of the recorded digital data and the repeatable magnetic characteristic;

a digitizer configured to sample a portion of the analog signal to provide digitized samples indicative of the repeatable magnetic characteristic;

a waveform circuit configured to provide range data characteristics of at least the sampled portion of the analog signal;

a storage configured to store representations of the digitized samples and the range data as identification data to identify the document; and a processor configured to determine whether the digital data recorded on the magnetic stripe has been copied from the authentic document using the digitized samples of the repeatable magnetic characteristic; and wherein the processor is also configured to determine whether the repeatable magnetic characteristic has been copied from the authentic document using the range data.

2. An identification system according to claim 1 wherein the magnetic stripe is recorded with a series of leading zeros and the digitizer samples the analog signal in a portion representing the series of leading zeros.

3. An identification system according to claim 1 wherein the magnetic stripe is recorded with digital data represented by magnetic transitions and the digitizer samples a portion of the analog signal representing spaces between said magnetic transitions to provide a digitized samples indicative of the repeatable magnetic characteristic.

4. An identification system according to claim 1 wherein the documents comprise magnetic stripe cards and wherein the digital data recorded on the magnetic stripes includes data for fetching identification data from the storage.

5. An identification system for identifying authentic documents bearing a magnetic stripe recorded with digital data and having a repeatable magnetic characteristic that has unique range characteristics, comprising:

a magnetic stripe sensor configured to sense the magnetic stripe to provide an analog signal representative of the recorded digital data and the repeatable magnetic characteristic;

a magnetic characteristic circuit configured to provide magnetic characteristic representations indicative of the repeatable magnetic characteristic;

a waveform circuit configured to provide range representations indicative of the range characteristics of the analog signal generated from a portion of the magnetic stripe including the repeatable magnetic characteristic by the magnetic stripe sensor; and a forming circuit to provide document identification representations based on the magnetic characteristic representations and the range representations to identify the documents.

6. An identification system according to claim 5 further including storage to store document identification representations and a comparison structure for comparing document identification representations from the storage with document identification representations from the forming circuit to verify a document.

7. An identification system according to claim 6 wherein the storage stores a plurality of document identification representations for comparison with a document identification representation from the forming circuit and wherein verification requires a degree of dissimilarity.

8. An identification system according to claim 5 wherein the magnetic characteristic circuit provides magnetic characteristic representations from the analog signal at substantially flat sections to produce a predetermined number of digital samples.

9. An identification system according to claim 5 wherein the waveform circuits provides range representations indicative of amplitudes of the analog signal.

10. An identification system according to claim 5 wherein the waveform circuit provides range representations indicative of ratios of amplitudes of the analog signal at predetermined locations.

11. A system for use with a card bearing a magnetic stripe having a repeatable magnetic characteristic that has known range characteristics and recorded with digital data in the form of magnetic transitions, said system for providing a sensed characteristic identification for the card, comprising:

means for sensing said magnetic stripe to provide representations of digitally recorded data and representations of the repeatable magnetic characteristic in the form of digital sample signals;

means for selectively storing card identification words formed from the digital sample signals to manifest the repeatable magnetic characteristic of a card and known range characteristics of the repeatable magnetic characteristic.

12. A process for identifying authentic documents bearing a magnetic stripe having a distinct magnetic characteristic that is capable of repeated sensing to identify individual documents and that possesses known range characteristics, said process including the steps of:

sensing the magnetic stripe to produce a representative analog signal manifesting the distinct magnetic characteristic;

providing magnetic characteristic representations indicative of the distinct magnetic characteristic;

providing range characteristic representations indicative of the range characteristics of the magnetic characteristic; and providing identification representations based on the magnetic characteristic representations and the range characteristic representations to identify the documents.

13. A document, or the like, having its fingerprint recorded for the later verification of its identity, the document having a magnetic medium, the fingerprint comprising remanent noise of at least a portion of the magnetic medium, and a characteristic of an analog waveform sensed from the portion of the magnetic medium containing the remanent noise.

14. A document, or the like, according to claim 13 wherein the characteristic of an analog waveform is a ratio of waveform amplitudes at specific locations.

15. A document, or the like, according to claim 14 wherein the characteristic of an analog waveform is a ratio of peak amplitudes at spaced apart locations in the waveform.

16. A document, or the like, according to claim 13 comprising a plastic card bearing a magnetic recording stripe.

17. A document, or the like, according to claim 13 wherein the remanent noise and the characteristic of an analog waveform are recorded as the fingerprint for correlation with a subsequently sensed and formed fingerprint.

18. A document, or the like, according to claim 13 wherein the document has recorded in the magnetic medium portion, data for locating a reference fingerprint for correlation with a fingerprint sensed from the document.

19. The identification system of claim 1, wherein the range data includes information concerning ratios of pulse amplitude to center line offset.

20. The identification system of claim 5, wherein the range representations includes information concerning ratios of pulse amplitude to center line offset.

21. The system of claim 11, wherein the amplitude characteristics of the digital sample signals include information concerning ratios of pulse amplitude to center line offset.

22. The process of claim 12, wherein the range characteristic representations include information concerning ratios of pulse amplitude to center line offset.

23. An identification system for identifying documents bearing a magnetic stripe recorded with digital data and having a repeatable magnetic characteristic, comprising:

a magnetic stripe sensor for sensing the magnetic stripe to provide an analog signal representative of the recorded digital data and the repeatable magnetic characteristic;

a magnetic characteristic circuit providing magnetic characteristic representations indicative of the repeatable magnetic characteristic;

a waveform circuit for providing range data characteristic of the analog signal;

a forming circuit to provide document identification representations based on the magnetic characteristic representations and the range representations to identify the documents;

storage to store document identification representations and a comparison structure for comparing document identification representations from the storage with document identification representations from the forming circuit to verify a document; and wherein the storage stores a plurality of document identification representations for comparisons with a document identification representation from the forming circuit and wherein verification requires a degree of dissimilarity.

* * * * *

UNITED STATES PATENT AND TRADEMARK OFFICE
CERTIFICATE OF CORRECTION

PATENT NO. : 6,899,269 B1
DATED : May 31, 2005
INVENTOR(S) : Robert S. DeLand, Jr. et al.

It is certified that error appears in the above-identified patent and that said Letters Patent is hereby corrected as shown below:

Title page,
Item [75], Inventors, add -- , Jr. -- to "Robert S. DeLand" to read -- Robert S. DeLand, Jr. --; and add additional inventor to read -- Robert E. Morley, Jr., St. Louis, MO (US) --.

Signed and Sealed this

Thirtieth Day of August, 2005

JON W. DUDAS
*Director of the United States Patent and Trademark Office*